United States Patent
Maeda

(10) Patent No.: US 6,820,920 B2
(45) Date of Patent: Nov. 23, 2004

(54) VEHICLE REAR STRUCTURE

(75) Inventor: Hirotsugu Maeda, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/642,824

(22) Filed: Aug. 19, 2003

(65) Prior Publication Data

US 2004/0036318 A1 Feb. 26, 2004

(30) Foreign Application Priority Data

Aug. 22, 2002 (JP) .......................................... 2002-241954

(51) Int. Cl.⁷ ................................................ B60J 5/10
(52) U.S. Cl. ............................. 296/146.8; 296/146.12; 49/386
(58) Field of Search ........................ 296/50, 57.1, 61, 296/106, 146.8, 146.11, 146.12; 49/386, 501

(56) References Cited

U.S. PATENT DOCUMENTS

| | | | | |
|---|---|---|---|---|
| 2,433,169 A | * | 12/1947 | Stephenson | .................. 296/106 |
| 2,796,287 A | * | 6/1957 | Moyes | ......................... 296/106 |
| 3,010,760 A | * | 11/1961 | Trautmann | ................... 296/57.1 |
| 3,336,070 A | * | 8/1967 | Jackson | ....................... 296/57.1 |
| 3,398,985 A | * | 8/1968 | Rhoades | ...................... 296/106 |
| 3,612,601 A | * | 10/1971 | Himka et al. | ................ 396/106 |
| 4,688,844 A | | 8/1987 | Hirose et al. | |
| 6,217,097 B1 | * | 4/2001 | Rogers et al. | .............. 296/106 |
| 6,397,836 B1 | * | 6/2002 | Pelletier et al. | ................ 49/386 |
| 2001/0013710 A1 | | 8/2001 | Pommeret | |

FOREIGN PATENT DOCUMENTS

| | | |
|---|---|---|
| EP | 0 718 134 A1 | 6/1996 |
| JP | 2002-87066 A | 3/2002 |

* cited by examiner

Primary Examiner—Lori L. Coletta
(74) Attorney, Agent, or Firm—Birch, Stewart, Kolasch & Birch, LLP

(57) ABSTRACT

A vehicle rear structure having an upper door and a lower door for opening and closing a rear opening of a vehicle, and a damper mechanism for slowing opening and closing movements of the lower door is provided. The damper mechanism is placed in a space formed by an outer panel and an inner panel constituting a side panel.

20 Claims, 15 Drawing Sheets

VEHICLE REAR STRUCTURE

FIELD OF THE INVENTION

The present invention relates to a vehicle rear structure and, more particularly, to an improved door structure in which a rear opening of the vehicle is closed by an upper door and a lower door.

BACKGROUND OF THE INVENTION

A vehicle arranged to close its rear opening with upper and lower doors is known. Such a vehicular tailgate structure is disclosed in, for example, Japanese Patent Laid-Open Publication No. 2002-87066 entitled "VEHICLE REAR STRUCTURE." The disclosed vehicle rear structure will be described briefly with reference to FIG. 15 hereof.

As shown in FIG. 15, a vehicle 100 has a large opening 103 provided in a rear surface 102 of a vehicle body 101, an upper door 104 swingable in a rearward and upward direction for opening and closing an upper half 103a of the opening 103, and a lower door 105 swingable in a rearward and downward direction for opening and closing a lower half 103b of the opening 103. The lower door 105 attached to a lower edge 103c of the opening 103 by hinges 106, 106 is driven for opening and closing via two pairs of link arms 108 and 109 rotatably connected to drive motors 107. Reference numeral 111 denotes a slope board.

When the lower door 105 of the vehicle 100 is opened, the link arms 108 and 109 are extended outside of the vehicle 100. The link arms 108 and 109 extended outside are likely to obstruct loading and unloading of objects. There is a room for improvement to increase the workability of loading and unloading.

The lower door 105 is not provided with a damper mechanism (not shown) for slowing the opening and closing movements. Even if a damper mechanism is provided to the lower door 105, consideration is required to prevent the damper mechanism from obstructing loading and unloading of objects with the lower door 105 opened.

It is thus required for a vehicle arranged to close a rear opening of the vehicle with upper and lower doors to increase the workability of loading and unloading of objects through the rear opening.

SUMMARY OF THE INVENTION

According to an aspect of the present invention, there is provided a vehicle rear structure which comprises: a vehicle body having an opening at a rear portion of the vehicle; an upper door and a lower door for closing the rear opening; and a damper mechanism placed between an outer panel and an inner panel forming a wall of the vehicle body and attached to at least the lower door for slowing opening and closing movements of the lower door.

The damper mechanism for slowing opening and closing movements of at least the lower door is placed between the outer panel and the inner panel constituting the wall of the vehicle body, so that the damper mechanism is prevented from extending out to the rear opening of the vehicle or to the vehicle outside when the lower door is opened. The damper mechanism is thus prevented from obstructing loading and unloading of objects with the lower door opened. Workability in loading and unloading through the rear opening can thus be increased. In addition, the damper mechanism does not appear when the lower door is opened, improving the appearance of the vehicle.

Preferably, the damper mechanism comprises: a hinge support provided within the wall in the vicinity of a lower edge portion of the rear opening; a hinge shaft rotatably mounted to the hinge support, the hinge shaft having a distal end extending from the wall toward the vehicle transverse center to be mounted to a lower portion of the lower door; a hinge arm extending from the hinge shaft radially of the hinge shaft; and a damper stay having a first end and a second end, the first end being connected to a distal end of the hinge arm in a vertically swingable manner, the second end being connected to a stay support within the wall in a vertically swingable manner.

By virtue of the damper mechanism which has the hinge support disposed within the wall closely to the lower edge portion of the rear opening, and a lower side portion of the lower door attached to the distal end of the hinge shaft rotatably mounted to the hinge support, the lower door is supported on the hinge support via the hinge shaft in an openable and closable fashion. The hinge arm is extended from the hinge shaft radially of the hinge shaft, and the first end of the damper stay is connected to the distal end of the hinge arm, whereby the lower door can move slowly when opened or closed. That is, the hinge shaft supporting the lower door in an openable and closable manner can also serve as a transmission member for transmitting opening and closing movements of the lower door to the damper stay. This is further advantageous in preventing the damper mechanism from extending out to the rear opening of the vehicle or to the vehicle outside when the lower door is opened. In addition, this allows the structure of the damper mechanism to be simplified with a reduced number of components.

In a preferred form, the damper mechanism comprises: a hinge support provided within the wall in the vicinity of a lower edge portion of the rear opening; a hinge shaft rotatably mounted to the hinge support, the hinge shaft having a distal end extending from the wall toward the vehicle transverse center to be mounted to a lower portion of the lower door; a hinge arm extending from the hinge shaft radially of the hinge shaft; a first link having a first end connected to a distal end of the hinge arm in a vertically swingable manner; a second link having a first end connected to a second end of the first link in a vertically swingable manner; a link support provided within the wall for mounting a central portion of the second link thereto so that the second link is vertically swingable about the central portion; a damper stay having a first end connected to a second end of the second link in a vertically swingable manner; and a stay support provided within the wall to which a second end of the damper stay is connected in a vertically swingable manner.

With the first end of the damper stay connected to the hinge shaft via the hinge arm and the first and second links, the positional relationship of the damper stay with respect to the hinge shaft can be relatively freely determined. When vehicle accessories or vehicle body components including a tail lamp are arranged close behind the damper mechanism, the damper mechanism can be freely designed not to interfere with those components.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
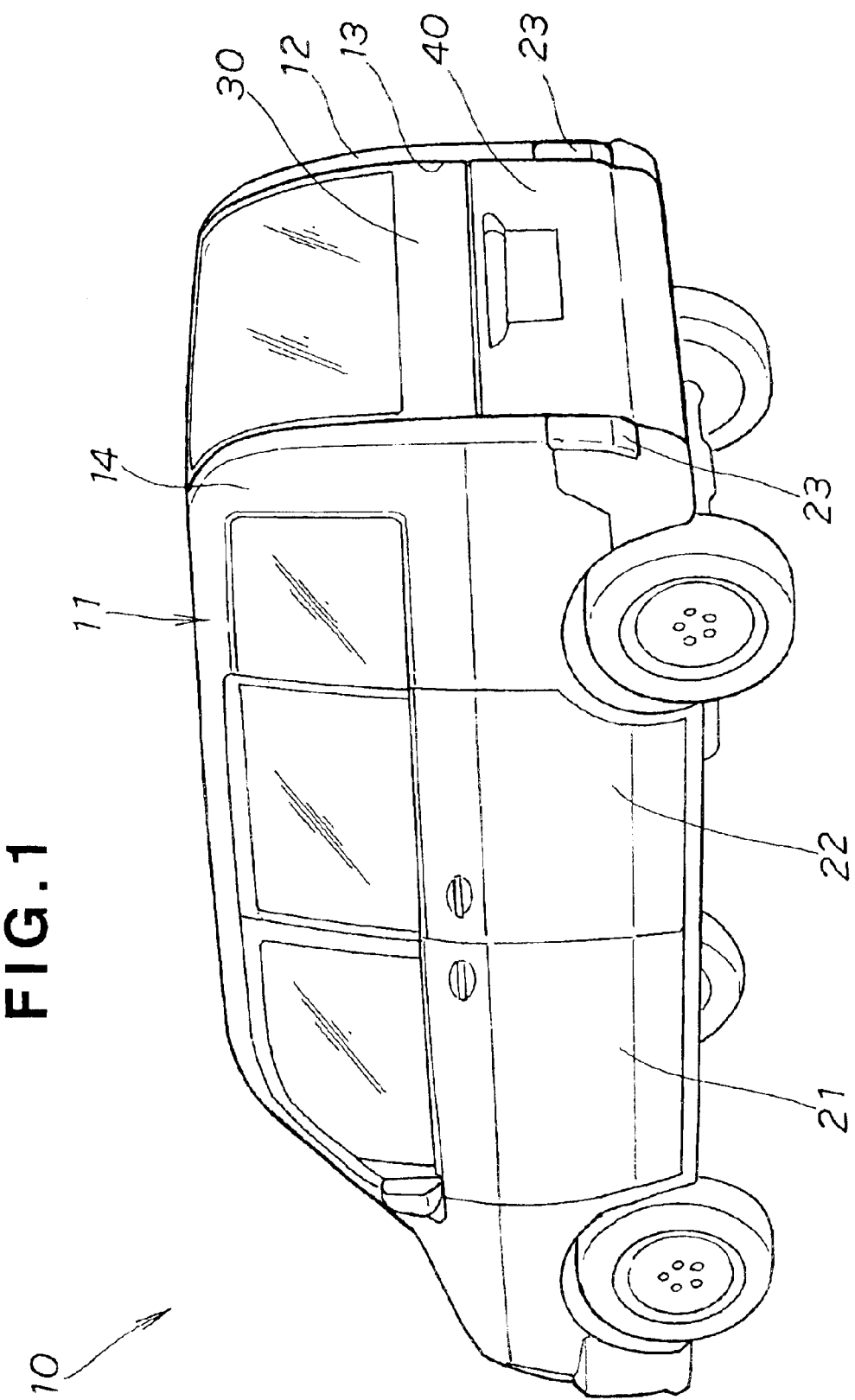
FIG. 1 is a perspective view of a vehicle with a rear structure according to the present invention.
Figure 2:
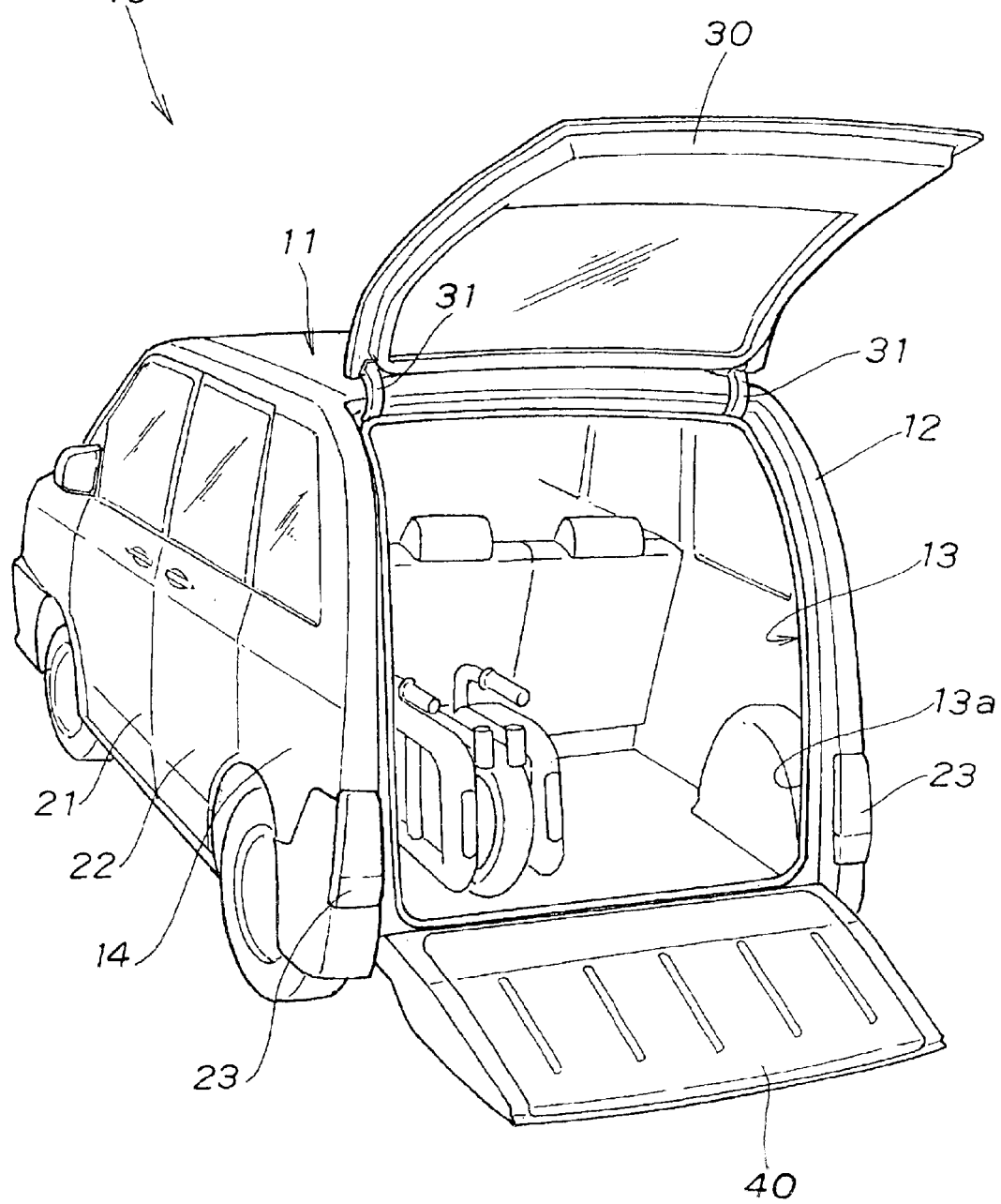
FIG. 2 is a perspective view of the vehicle with upper and lower doors provided at a rear opening of the vehicle of FIG. 1 opened.

As shown in FIGS. 1 and 2, a vehicle 10 has an opening 13 at a rear portion 12 of a vehicle body 11. The rear opening 13 is closed by an upper door 30 and a lower door 40. Reference numeral 21 denotes a front door and 22 a rear door.

As shown in FIG. 2, an upper half of the rear opening 13 is opened and closed by the upper door 30 swingable in a rearward and upward direction. A lower half of the rear opening 13 is opened and closed by the lower door 40 swingable in a rearward and downward direction. The vehicle body 11 has tail lamps 23, 23 at left and right lower portions of the rear portion 12. Opening and closing movements of the lower door 40 are slowed by left and right damper mechanisms 50, 50 (see FIG. 4). Reference numerals 31, 31 denote hinges for the upper door 30.

Figure 3:
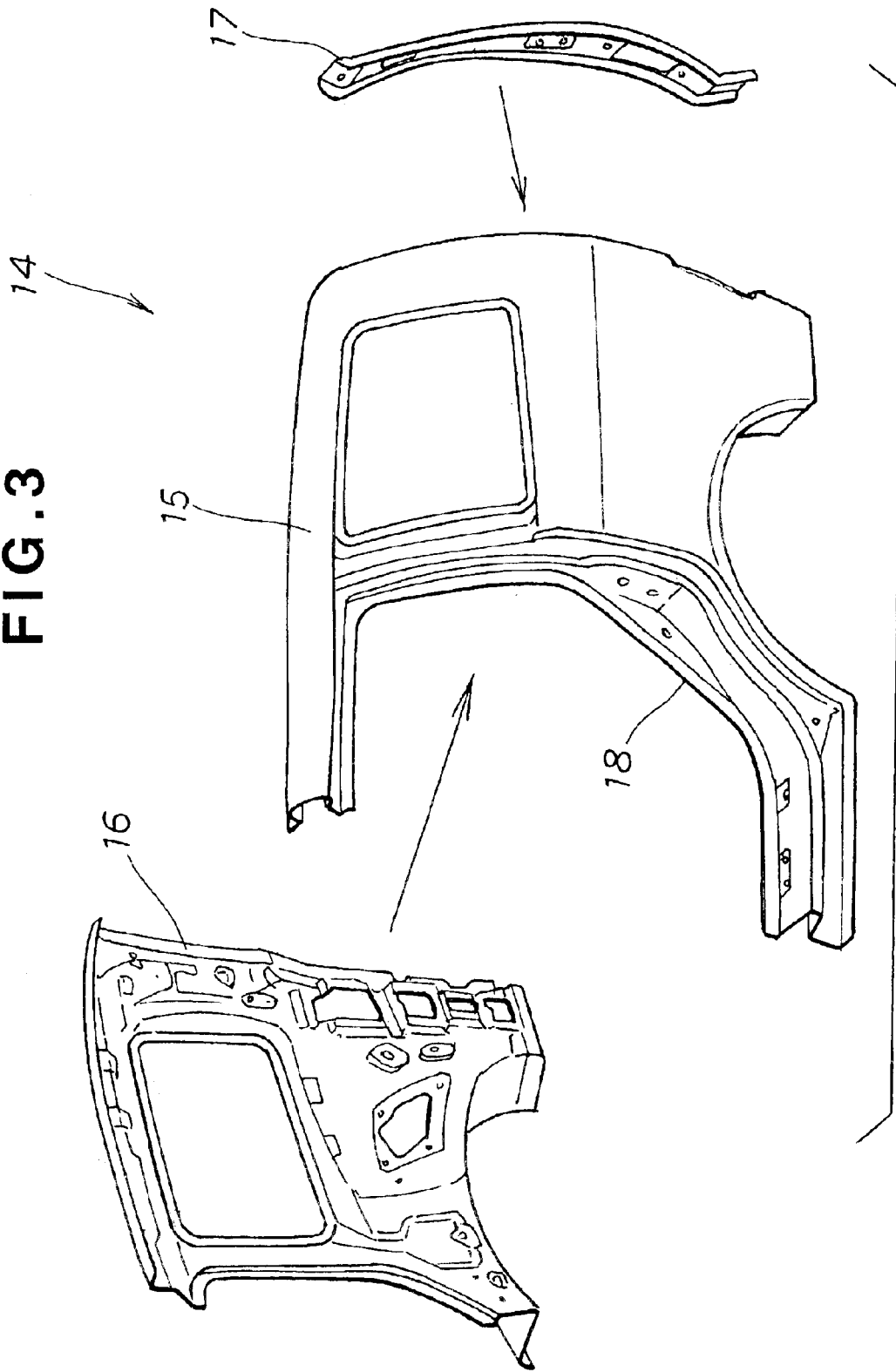
FIG. 3 is an exploded view of a vehicle rear body portion.

Reference is now made to FIG. 3 illustrating a left side panel 14 at a rear body portion. The side panel 14 consists of a steel plate outer panel 15 and a steel plate inner panel 16. In other words, the outer panel 15 and inner panel 16 constitute a wall 14 of the vehicle body 11, that is, a side panel 14. The side panel 14 is formed by connecting the rear end of the outer panel 15 and the rear end of the inner panel 16 with a steel plate C pillar gutter 17 (gutter panel 17). The inner panel 16 may be corrugated or formed unevenly for increased rigidity. A side panel 14 at a right rear portion has the same structure. Reference numeral 18 denotes an opening to be closed by the rear door 22 (see FIG. 1).

Now, a vehicle tailgate structure according to a first embodiment of the present invention will be described with reference to FIGS. 4 to 11.

Figure 4:
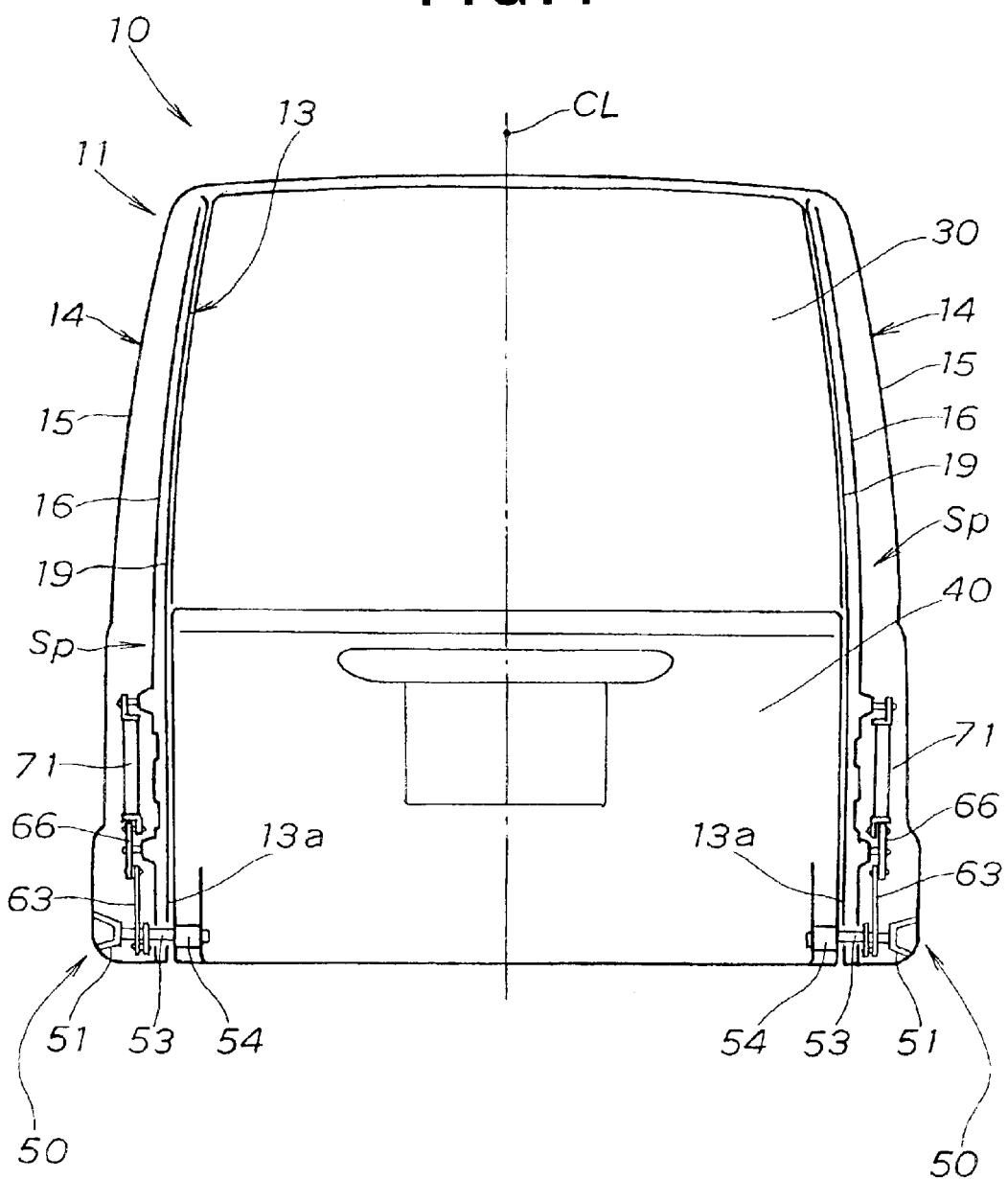
FIG. 4 is a schematic diagram of the rear structure of a vehicle body with damper mechanisms according to a first embodiment of the present invention.

As shown in FIG. 4, the left and right damper mechanisms 50, 50 are placed within the left and right side panels 14, 14, respectively. Specifically, the damper mechanism 50, 50 are placed in spaces Sp, Sp formed by the outer panels 15, 15 and the inner panels 16, 16 constituting the left and right walls 14, 14 of the vehicle body 11.

A plurality of components forming the damper mechanisms 50, 50 are vertically arranged in the spaces Sp, Sp along the side panels 14, 14, thereby to facilitate the placement of the damper mechanisms 50, 50 in the narrow spaces Sp, Sp. Left and right hinge supports 51, 51 for supporting the left and right damper mechanisms 50, 50 are provided within the side panels 14, 14 in the vicinities of lower edge portions 13a, 13a of the opening 13. The left and right damper mechanisms 50, 50 are configured symmetrical with the vehicle transverse center CL as the center line. The vehicle body 11 has a resin interior panel 19 at the inside of the inner panel 16 (inside the passenger compartment).

Figure 5:
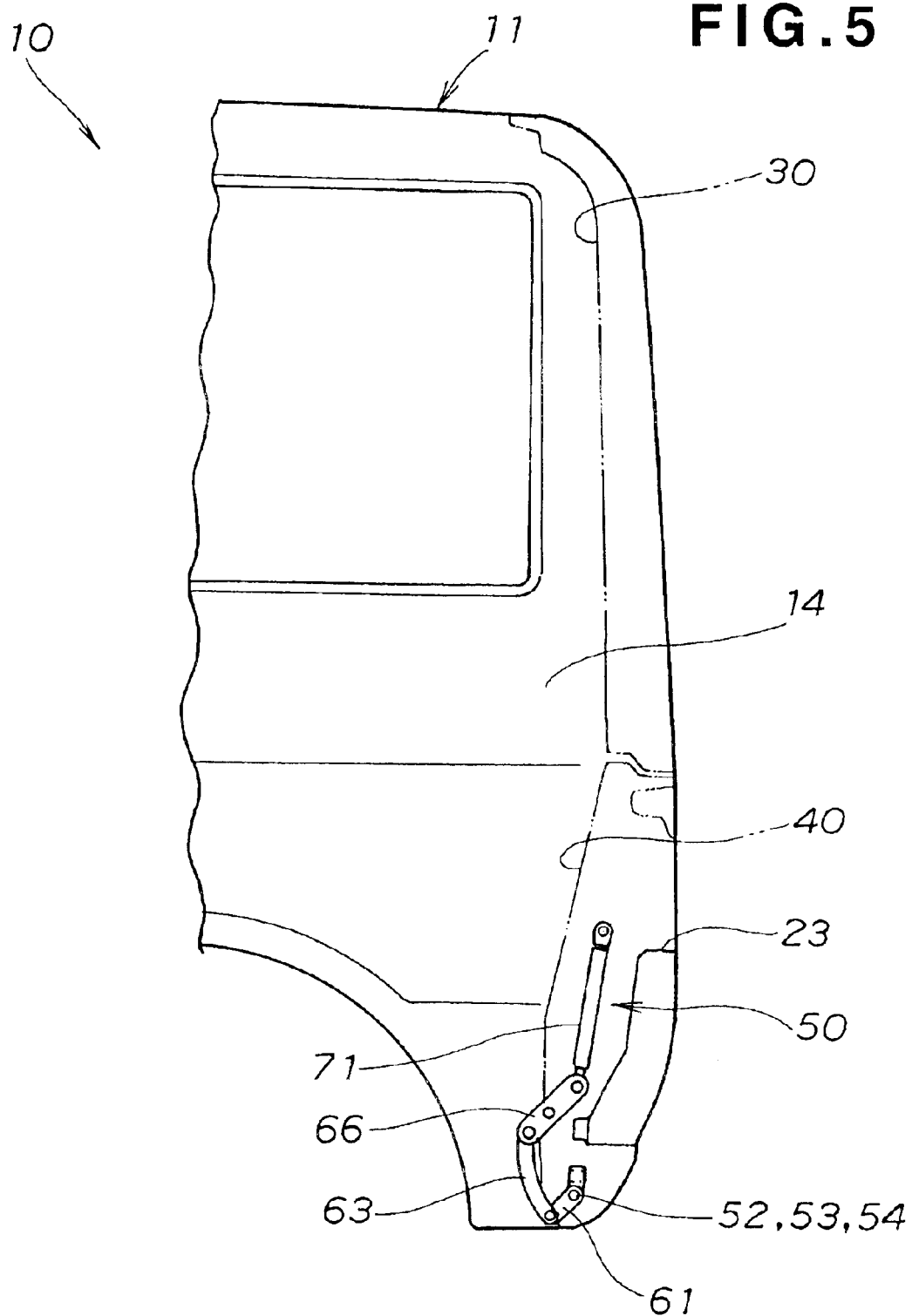
FIG. 5 is an enlarged schematic diagram illustrating the rear structure of the vehicle body of FIG. 4.

Turning now to FIG. 5, the damper mechanism 50 is provided in a rear lower portion of the vehicle body 11. The tail lamp 23 is arranged rearward of the damper mechanism 50.

Figure 6:
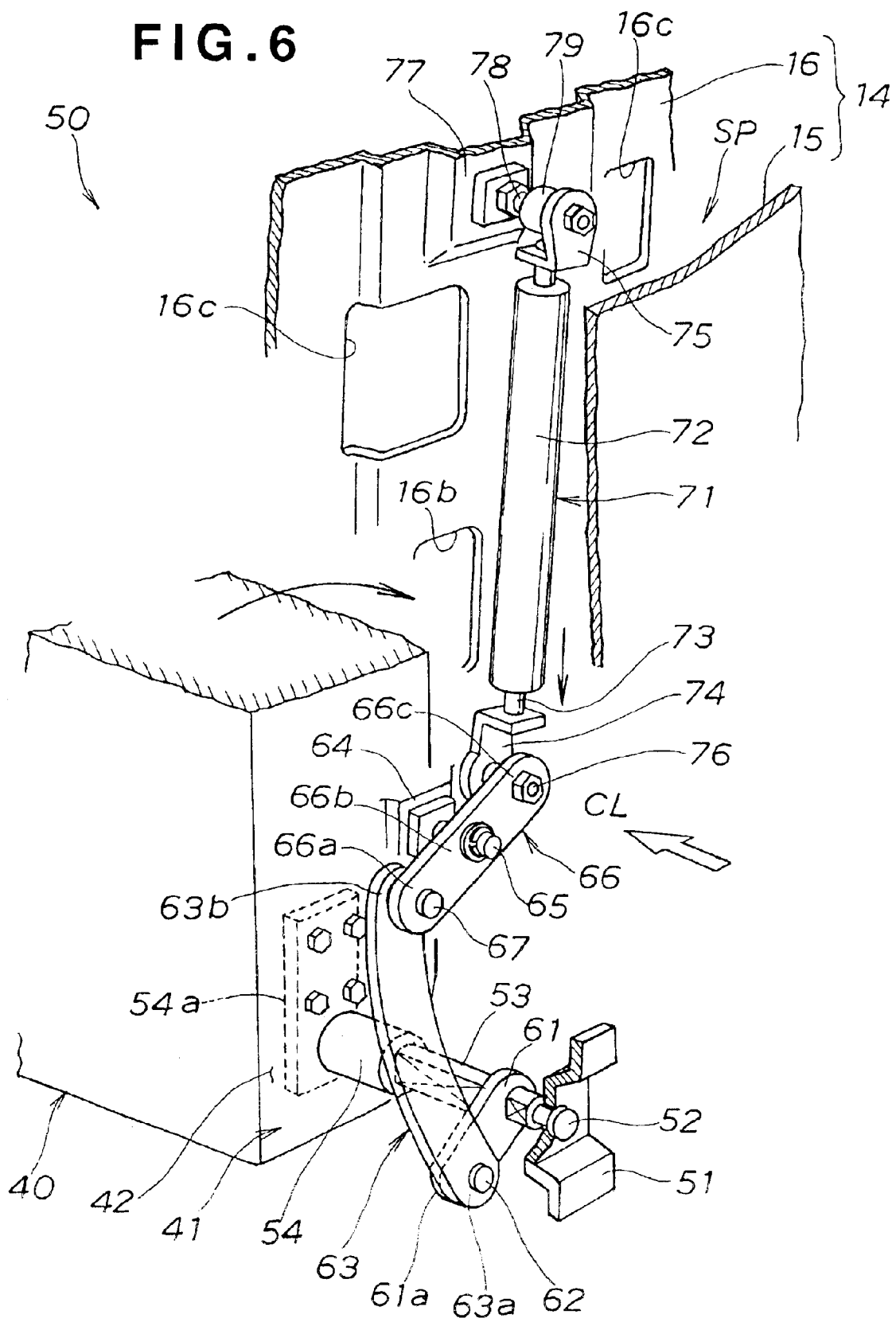
FIG. 6 is a perspective view of the damper mechanism according to the first embodiment.

Next, reference is made to FIG. 6 illustrating the left damper mechanism 50. The damper mechanism 50 is supported on the hinge support 51 provided within the side panel 14 (within the wall 14). A hinge shaft 53 is rotatably mounted to the hinge support 51. The distal end of the hinge shaft 53 extends from the side panel 14 toward the vehicle transverse center CL as shown by an arrow and is secured to a lower portion 41 of the lower door 40 via a door holding part 54. A hinge arm 61 extends from the hinge shaft 53 radially of the hinge shaft 53. A first end 63a of a first link 63 is vertically swingably connected to a distal end 61a of the hinge arm 61. A second end 63b of the first link 63 is vertically swingably connected to a first end 66a of a second link 66. A central portion 66b of the second link 66 is vertically swingably mounted to a link support 64 within the side panel 14. A second end 66c of the second link 66 is vertically swingably connected to a first end 74 of a damper stay 71. A second end 75 of the damper stay 71 is vertically swingably connected to a stay support 77 within the side panel 14.

The damper stay 71 is a cylinder-type open stay filled with liquid or gas, consisting of a cylinder 72 and a piston rod 73 fitted in the cylinder 72 to be able to move in and out. The first end 74 of the damper stay 71 is a connecting member 74 fixed at the front end of the piston rod 73. The second end 75 of the damper stay 71 is a connecting member fixed at the rear end of the cylinder 72.

Figure 7:
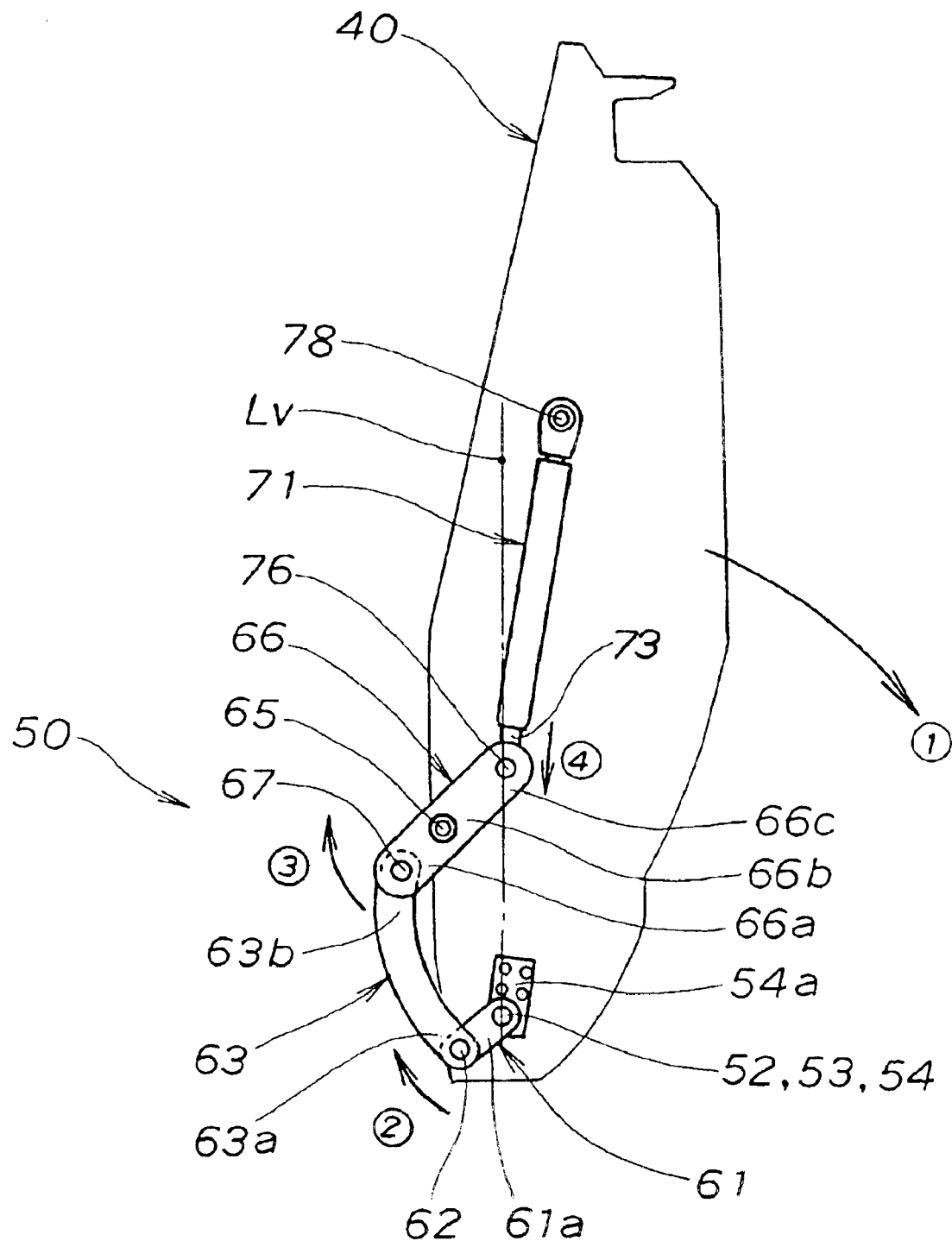
FIG. 7 is a diagram illustrating the relationship between the damper mechanism of FIG. 6 and the lower door.

Referring to FIG. 7, the positional relationships of the damper mechanism 50 will be described in detail. With the lower door 40 closed, a third connecting pin 76 and a support shaft 78 are disposed in the vicinities of a vertical line Lv passing the hinge shaft 53. First and second connecting pins 62 and 67 and a support shaft 65 are disposed forward of the vertical line Lv (left in FIG. 7).

With this arrangement of the shafts and pins, the hinge arm 61 is extended from the hinge shaft 53 in a forward and downward direction. The second link 66 is disposed above the hinge arm 61 substantially in parallel with the hinge arm 61 so as to incline the second link 66 in a forward and downward direction. The first link 63 is connected between the distal end (front end) 61a of the hinge arm 61 and the first end (front end) 66a of the second link 66. That is, the hinge arm 61 and the first and second links 63 and 66 constitute a parallel link structure.

The combined structure of the hinge arm 61 and the first and second links 63 and 66 thus has a substantially C shape opening rearward and inclined forward in a side view. Even if vehicle accessories or vehicle body components including the tail lamp 23 are disposed close behind the damper mechanism 50 as shown in FIG. 5, the damper mechanism 50 is thus prevented from interfering with those components.

In this manner, the positional relationship of the damper stay 71 with respect to the hinge shaft 53 can be relatively freely determined. Even in the case where vehicle accessories or vehicle body components are arranged close behind the damper mechanism 50, the damper mechanism 50 can be freely designed not to interfere with those components, increasing the degree of freedom in design.

The damper stay 71 extends from the second end 66c of the second link 66 upward along the lower door 40.

The hinge arm 61 and the second link 66 are bars of elongated linear plates. The first link 63 is a bar of a forwardly-curved elongated plate. The first link 63 is curved forward so as not to interfere with the support shaft 65 at the center of the second link 66 when moving vertically.

Now, the configuration of the damper mechanism 50 will be described in more detail with respect to FIGS. 8 to 10.

Figure 8:
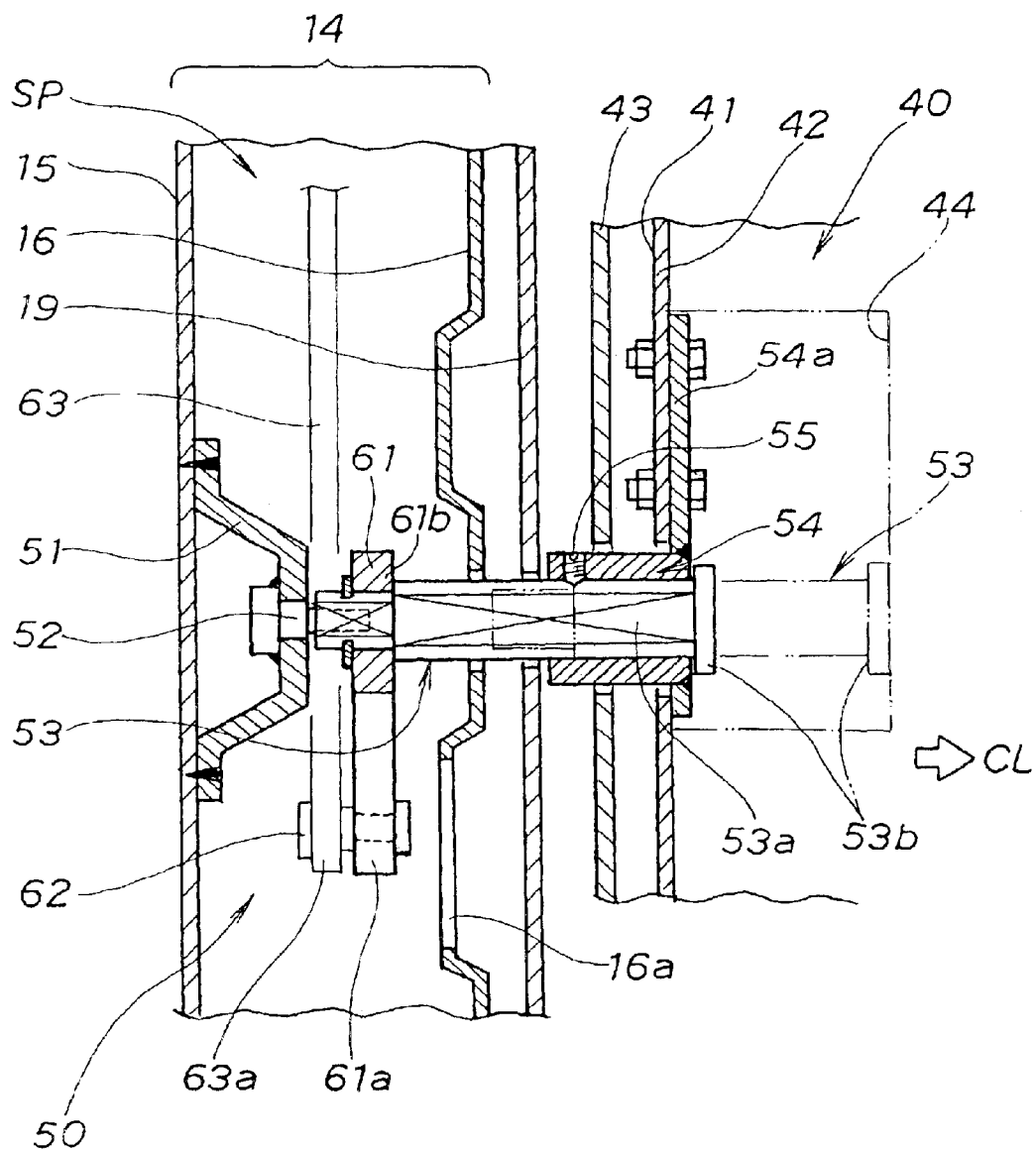
FIG. 8 is a cross-sectional view of a hinge shaft and surrounding parts in the damper mechanism according to the first embodiment.

As shown in FIG. 8, the hinge support 51 is fixed to the inner surface of the outer panel 15 by welding or the like within the side panel 14. A support pin 52 extends from the hinge support 51 toward the vehicle transverse center CL. The hinge shaft 53 has a fitting hole for receiving the support pin 52. The hinge shaft 53 is mounted on the support pin 52 via the fitting hole in a rotatable and axially movable manner. The hinge shaft 53 extends horizontally toward the vehicle transverse center CL, passing through the inner panel 16 and the interior panel 19. The hinge shaft 53 has the door holding part 54 mounted on its distal end 53a in a relatively non-rotatable manner. A flange 54a attached to the distal end of the door holding part 54 is bolted to a side plate 42 in the lower portion 41 of the lower door 40.

The hinge shaft 53 has a rectangular cross-sectional shape to be fitted into a fitting hole of a rectangular cross-section of the door holding part 54. The hinge shaft 53 is thus mounted to the door holding part 54 to be restricted in relative rotation while axially movable. The hinge shaft 53 is secured by a screw 55 not to axially move with respect to the door holding part 54. The inner panel 16 has an access hole 16a. The lower door 40 has an exterior panel 43.

A proximal end 61b of the hinge arm 61 is fitted on the hinge shaft 53 of a rectangular cross-section to be restricted in relative rotation, thereby integrally mounted on the hinge shaft 53. The distal end 61a of the hinge arm 61 is connected to the first end 63a of the first link 63 via the first connecting pin 62.

Figure 9:
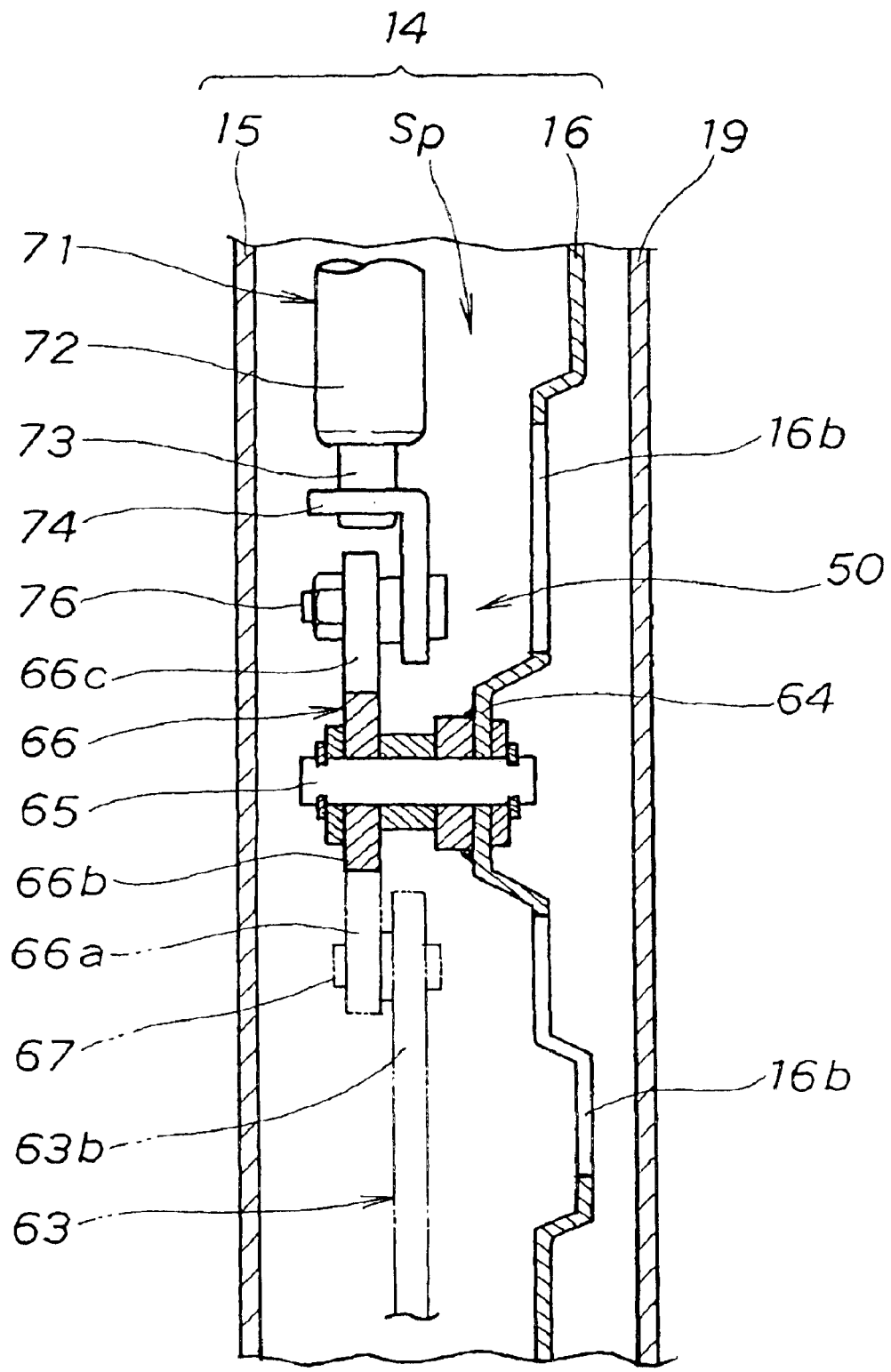
FIG. 9 is a cross-sectional view of a second link and surrounding parts in the damper mechanism according to the first embodiment.

Reference is now made to FIG. 9 illustrating the structure around the central portion 66b of the left second link 66 shown in FIG. 4. The inner panel 16 has the link support 64 of a mounting raised toward the outer panel 15. The support shaft 65 is mounted to the link support 64. The support shaft 65 extends horizontally toward the outer panel 15. The distal end of the support shaft 65 is mounted to the central portion 66b of the second link 66 so that the second link 66 is vertically swingable about the support shaft 65.

The first end 66a of the second link 66 and the second end 63b of the first link 63 shown by imaginary lines are connected with the second connecting pin 67 in a vertically swingable manner. The second end 66c of the second link 66 is connected to the connecting member 74 mounted on the distal end of the piston rod 73 with the third connecting pin 76 in a vertically swingable manner. The inner panel 16 has a plurality of access holes 16b.

Figure 10:
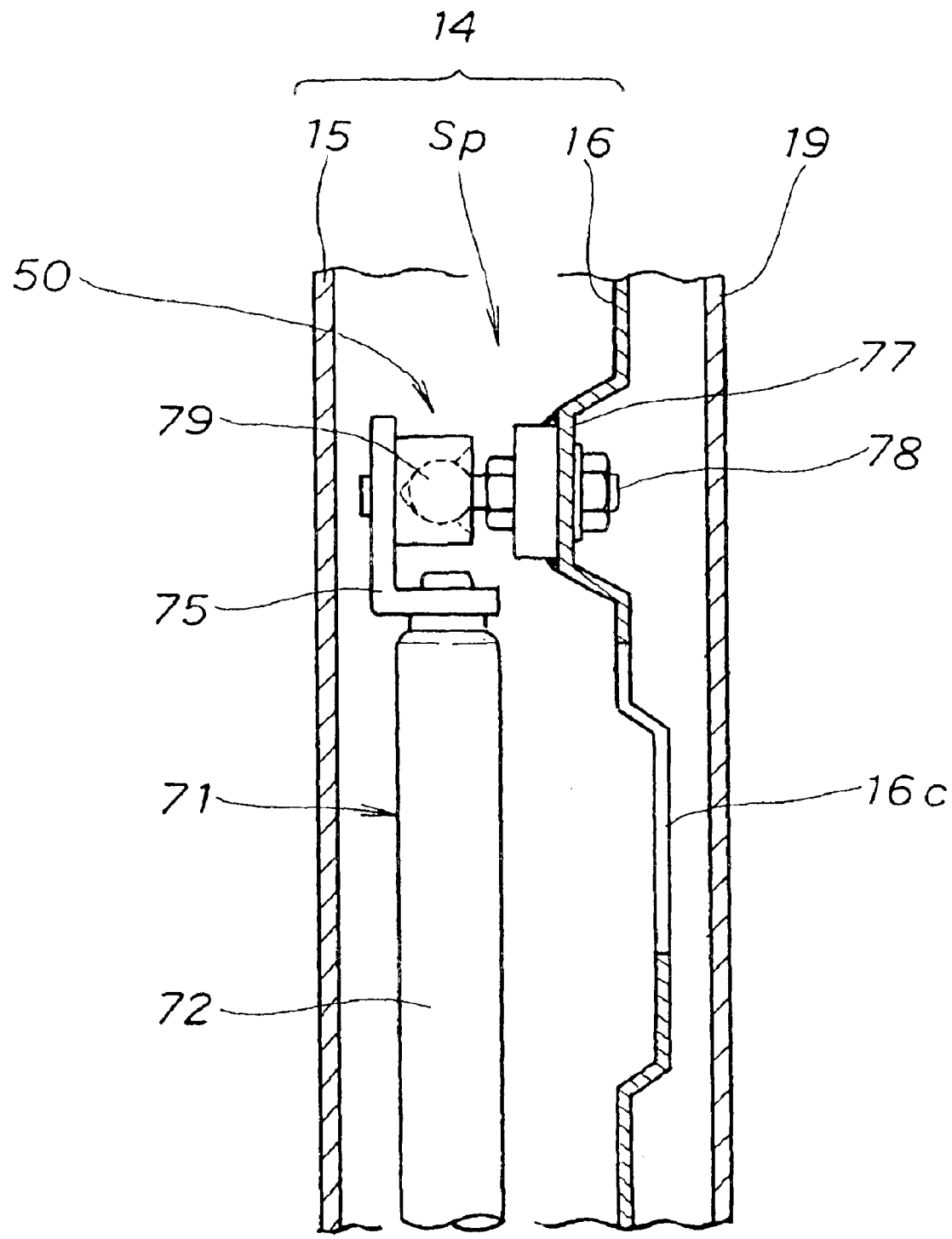
FIG. 10 is a cross-sectional view of a support of a damper stay and surrounding parts in the damper mechanism according to the first embodiment.

Referring to FIG. 10, the inner panel 16 has the stay support 77 of a mounting raised toward the outer panel 15 within the side panel 14. The support shaft 78 extending horizontally toward the outer panel 15 is bolted to the stay support 77. The distal end of the support shaft 78 has a ball joint 79. The upper end of the cylinder 72 is vertically swingably connected to the ball joint 79 via the connecting member 75. The inner panel 16 has an access hole 16c.

Now, the assembling procedure of the damper mechanism 50 will be described with reference to FIGS. 8 to 10.

As shown in FIG. 8, the lower door 40 has a recess 44 shown by imaginary lines inside. The hinge shaft 53 has a collar 53b at the distal end 53a.

First, the hinge shaft 53 is fitted into the door holding part 54, and the door holding part 54 is secured to the lower door 40. In this state, the collar 53b abuts on the edge of the door holding part 54, and the hinge shaft 53 is axially slidable by the depth of the recess 44.

Next, the lower door 40 is interposed between the left and right side panels 14, 14 (only the left one is shown in FIG. 8) with the hinge shafts 53 drawn into the recesses 44. Then, the hinge shafts 53 are each drawn out from the recess 44 into the space Sp within the side panel 14 to mount the hinge arm 61 on the hinge shaft 53.

The support pin 52 is inserted into the fitting hole of the hinge shaft 53 and the hinge shaft 53 is secured to the door holding part 54 by the screw 55. Then, in the space Sp, the first end 63a of the first link 63 is connected to the distal end 61a of the hinge arm 61 with the first connecting pin 62.

The above components assembled in the space Sp can be put in or out through the access hole 16a of the inner panel 16. Hands are inserted through the access hole 16a to do work in the space Sp.

Next, as shown in FIG. 9, components around the second link 66 are assembled.

First, the support shaft 65 is mounted to the link support 64. Then, in the space Sp, the second link 66 is mounted on the support shaft 65. The first link 63 is connected to the first end 66a of the second link 66 with the second connecting pin 67, and the second end 66c and the connecting member 74 of the piston rod 73 are connected with the third connecting pin 76.

The above components assembled in the space Sp are put in or out through the access holes 16b of the inner panel 16. Hands are inserted through the access holes 16b to do work in the space Sp.

Finally, as shown in FIG. 10, components around the support of the damper stay 71 are assembled. The connecting member 75 at the upper end of the cylinder 72 is mounted to the stay support 77 via the ball joint 79 and the support shaft 78, finishing the assembling work.

The above components assembled in the space Sp are put in or out through the access hole 16c of the inner panel 16. Hands are inserted through the access hole 16c to do work in the space Sp.

As is clear from the above description, the access holes 16a, 16b and 16c are formed in the inner panel 16 to assemble the damper mechanism 50 in the space Sp. The shapes, dimensions and numbers of the access holes 16a, 16b and 16c are set to allow various parts of the damper mechanism 50 to be put in and out therethrough and also to facilitate assembling work by inserting hands and tools therethrough into the space Sp. Despite the placement of the damper mechanism 50 in the very narrow space Sp within the side panel 14, the damper mechanism 50 can thus be easily assembled.

Now, the movement of the lower door 40 and the damper mechanism 50 of the above configurations will be described with reference to FIGS. 7 and 11.

FIG. 7 illustrates the damper mechanism 50 with the lower door 40 closed. In this state, the lower door 40 is pulled rearward of the vehicle to tilt the lower door 40 about the support pin 52 in a clockwise direction (direction of arrow ①) for opening. As the lower door 40 opens, the hinge arm 61 rotates in a clockwise direction (direction of arrow ②), so that the second link 66 swings in a clockwise direction in the figure (direction of arrow ③) about the support shaft 65 via the first link 63. As a result, the piston rod 73 of the damper stay 71 is pulled in the direction of arrow ④ by the second link 66, exerting a damping effect, and the lower door 40 slowly opens.

Figure 11:
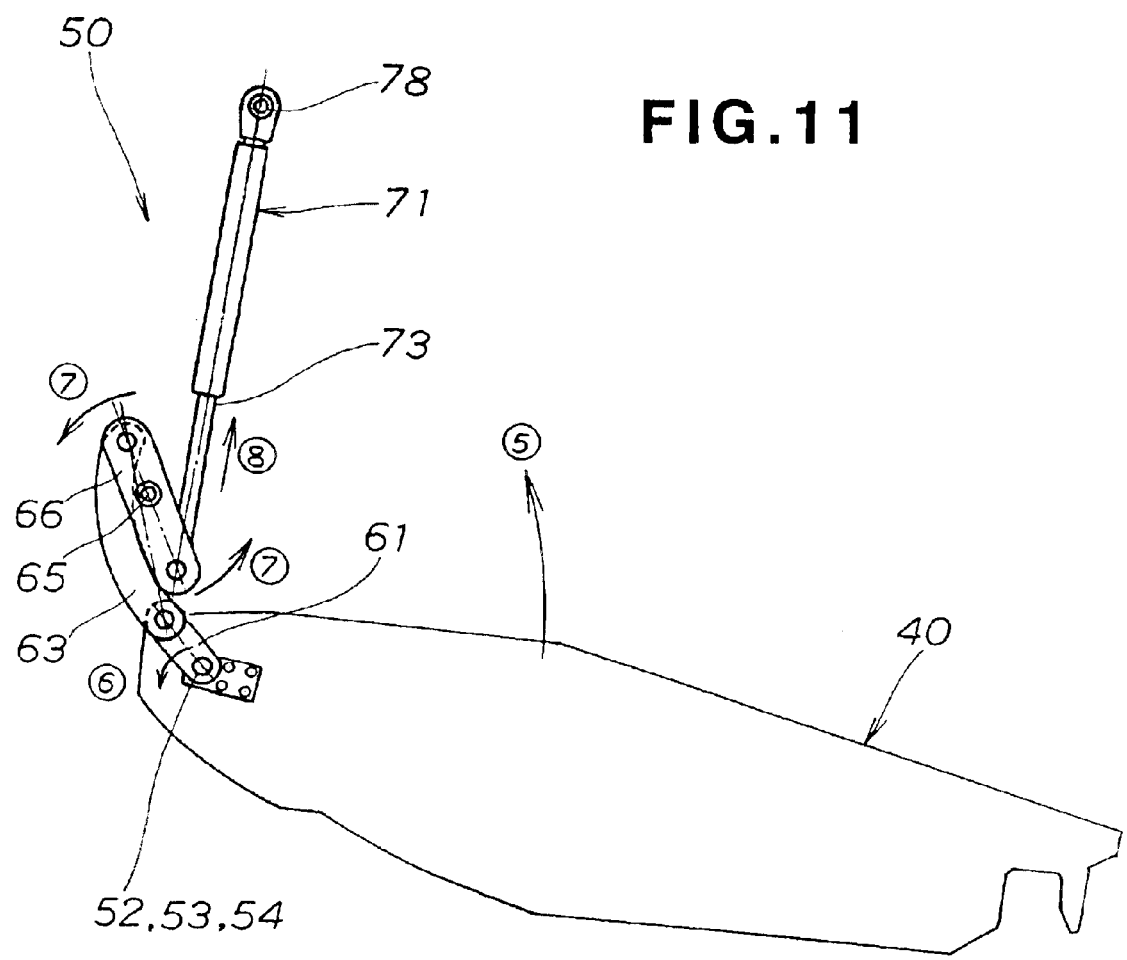
FIG. 11 is a diagram illustrating a state in which the lower door of FIG. 7 is opened.

FIG. 11 illustrates the lower door 40 in a fully open state. In the fully open state, the hinge arm 61 and the first and second links 63 and 66 are located in the vicinities of the hinge shaft 53 (support pin 52) or forward of the hinge shaft 53. The damper mechanism 50 thus remains in the space Sp (see FIG. 4).

When the lower door 40 in this state is raised, the lower door 40 is rotated in a counterclockwise direction (direction of arrow ⑤) about the support pin 52 to be closed. With the rotation of the lower door 40, the hinge arm 61 rotates in a counterclockwise direction (direction of arrow ⑥), so that the second link 66 swings in a counterclockwise direction (direction of arrow ⑦) about the support shaft 65 via the first link 63. As a result, the piston rod 73 of the damper stay 71 is pushed back by the second link 66 as shown by arrow ⑧, exerting a damping effect, and the lower door 40 slowly closes.

To summarize the above, according to the tailgate structure of the vehicle 10 in the first embodiment, as shown in FIGS. 4 and 6, the damper mechanisms 50 for slowing opening and closing movements of at least the lower door 40 are placed between the outer panels 15 and the inner panels 16, so that the damper mechanisms 50 are prevented from extending out to the rear opening 13 of the vehicle or to the vehicle outside when the lower door 40 is opened. The damper mechanisms 50 are thus prevented from obstructing loading and unloading of objects with the lower door 40 opened. Workability in loading and unloading through the opening 13 can be further increased. In addition, the damper mechanisms 50 do not appear when the lower door 40 is opened, improving the appearance of the vehicle 10.

The hinge support 51 is provided within the wall 14 in the vicinity of the lower edge portion 13a of the rear opening 13, and the distal end of the hinge shaft 53 rotatably mounted to the hinge support 51 is mounted to the lower portion 41 of the lower door 40, so that the lower door 40 is supported on the hinge support 51 via the hinge shaft 53 in an openable and closable manner.

The hinge arm 61 is extended from the hinge shaft 53 radially of the hinge shaft 53, and the first end 74 of the damper stay 71 is connected to the distal end 61a of the hinge arm 61 via the first and second links 63 and 66, so that the lower door 40 is slowly opened and closed.

In this manner, the hinge shaft 53 supporting the lower door 40 in an openable and closable manner can also serve as a transmission member for transmitting the opening and closing movements of the lower door 40 to the damper stay 71. This is further advantageous in preventing the damper mechanism 50 from extending out to the rear opening 13 of the vehicle or to the vehicle outside when the lower door 40 is opened. Further, this allows the structure of the damper mechanism 50 to be simplified with a reduced number of components.

Now, a vehicle tailgate structure according to a second embodiment will be described with reference to FIGS. 12 and 13. Components identical to those of the door structure in the first embodiment shown in FIGS. 4 to 11 are given identical reference numerals and will not be described in detail.

A damper mechanism 80 in the second embodiment has a structure in which the first and second links 63 and 66 are eliminated as compared with the damper mechanism 50 in the first embodiment.

More specifically, in the damper mechanism 80 of the second embodiment, a hinge arm 61 is extended from a hinge shaft 53 radially of the hinge shaft 53 and one end of a damper stay 71 is connected to a distal end 61a of the hinge arm 61 in a vertically movable manner. The other end of the damper stay 71 is connected to a stay support 77 (see FIG. 6) inside a side panel 14 (see FIG. 6) in a vertically swingable manner. Other components are identical to those of the damper mechanism 50 in the first embodiment shown in FIGS. 4 to 11.

Now the operation of a lower door 40 and the damper mechanism 80 of the second embodiment will be described with reference to FIGS. 12 and 13.

Figure 12:
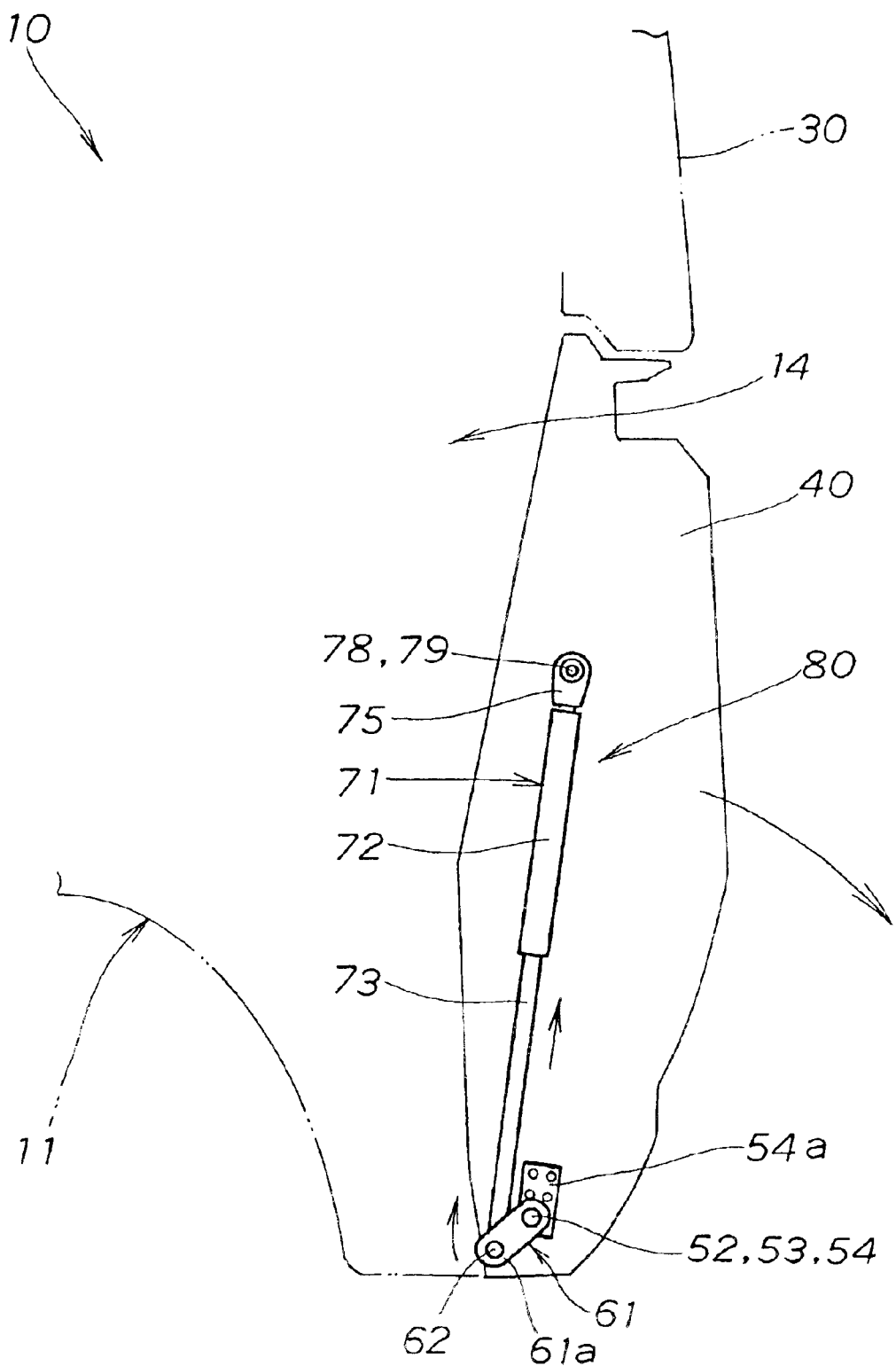
FIG. 12 is a schematic diagram of a damper mechanism, mounted to a lower door, according to a second embodiment of the present invention.

Reference is now made to FIG. 12 illustrating the damper mechanism 80 with the lower door 40 closed. The lower door 40 in this state is pulled rearward to tilt the lower door 40 about a support pin 52 in a clockwise direction for opening. With the vertical swing of the lower door 40 about the support pin 52, the hinge arm 61 swings in a clockwise direction as shown by an arrow. As a result, a piston rod 73 of the damper stay 71 is pushed by the hinge arm 61 upward for retraction, exerting a damping effect, and the lower door 40 slowly opens.

Figure 13:
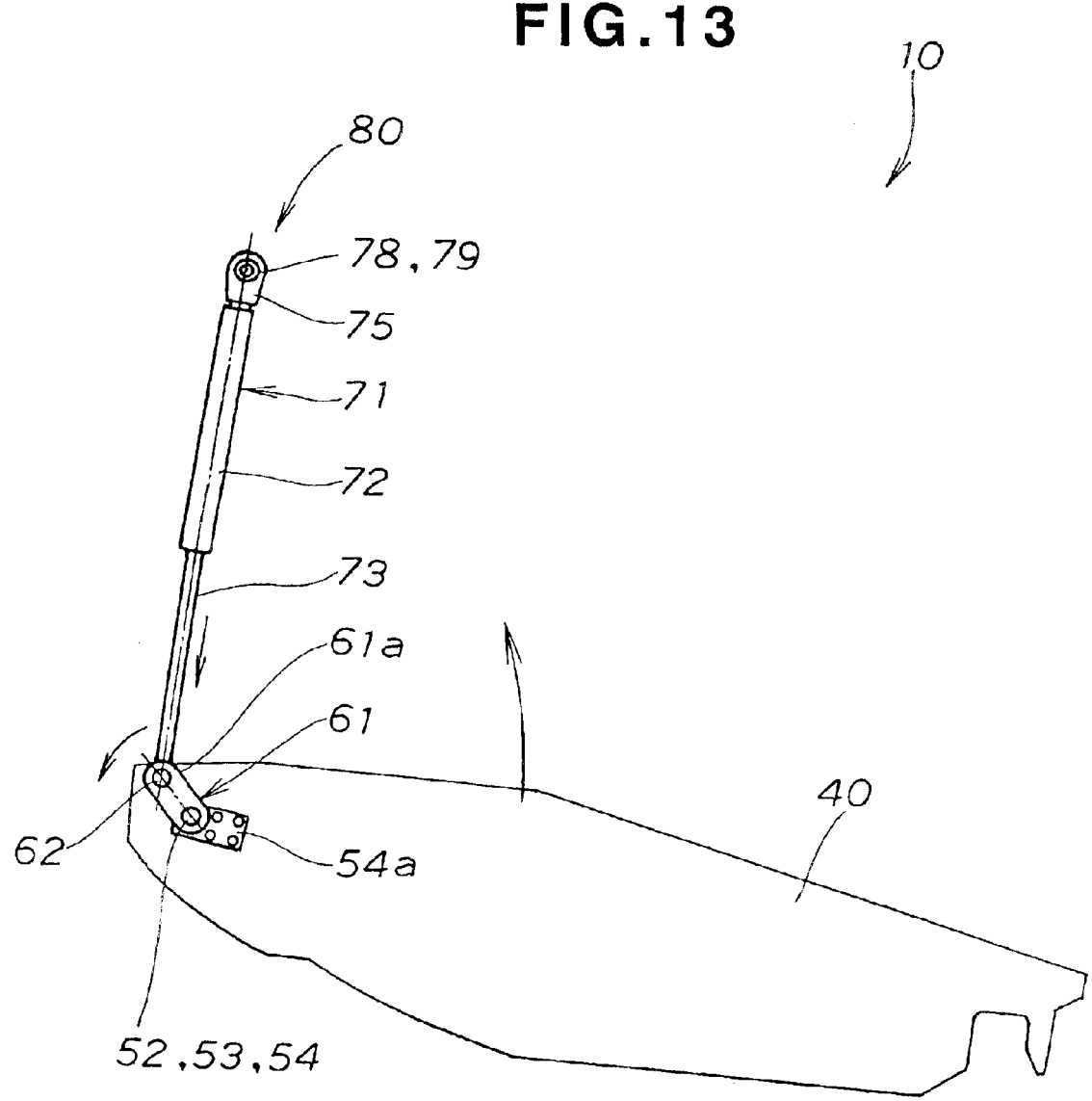
FIG. 13 is a schematic diagram illustrating a state in which the lower door in the state of FIG. 12 is opened.

As shown in FIG. 13, to close the lower door 40 from the fully open state, the lower door 40 is first raised upward, thereby to rotate the lower door 40 about the support pin 52 in a counterclockwise direction for closing. With the swing of the lower door 40 about the support pin 52, the hinge arm 61 rotates in a counterclockwise direction. As a result, the piston rod 73 of the damper stay 71 is pulled by the hinge arm 61 forward, exerting a damping effect, and the lower door 40 slowly closes.

Figure 14:
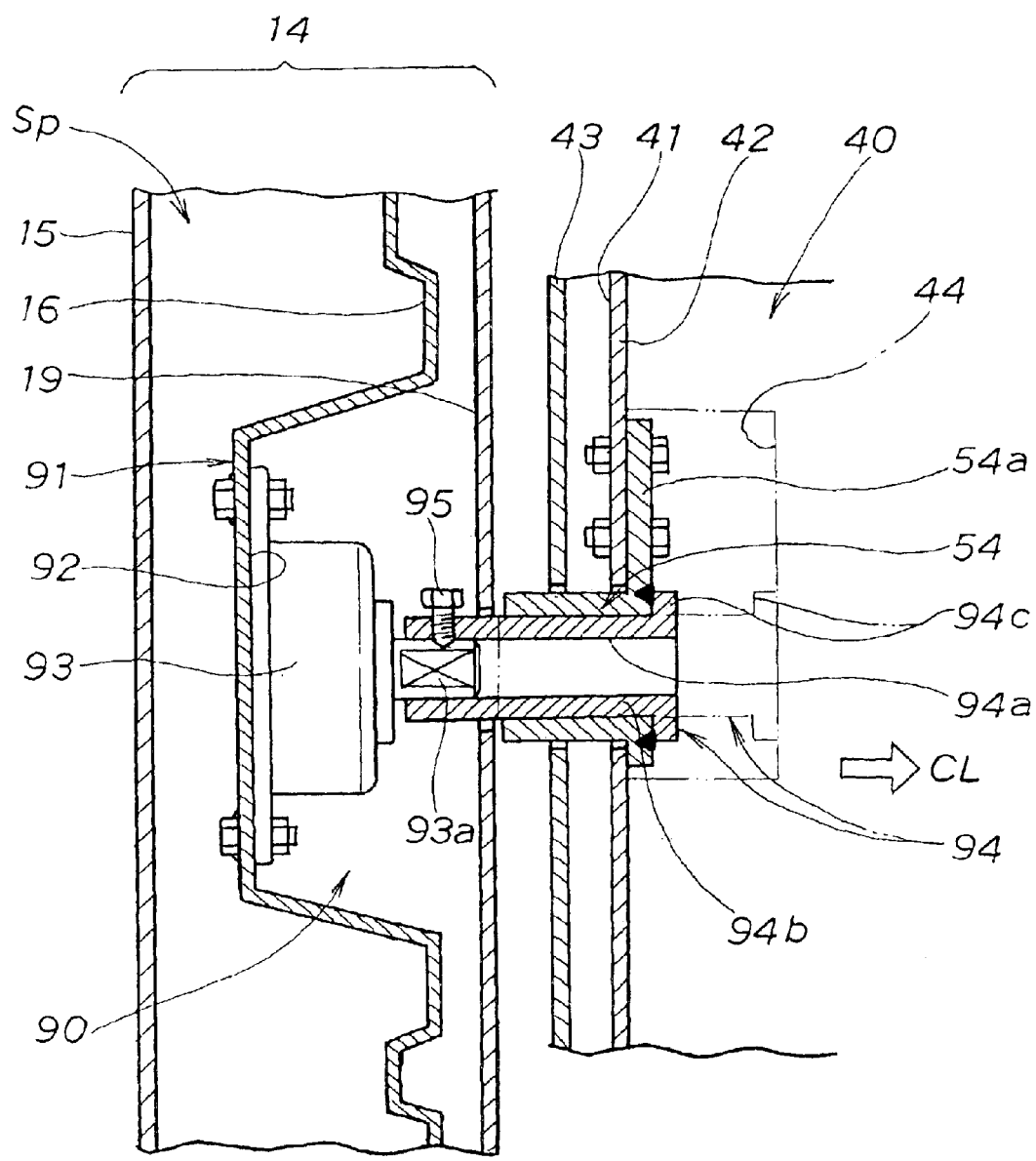
FIG. 14 is a cross-sectional view illustrating a hinge shaft at a lower door mounted with a damper mechanism and surrounding parts according to a third embodiment of the present invention.
Figure 15:
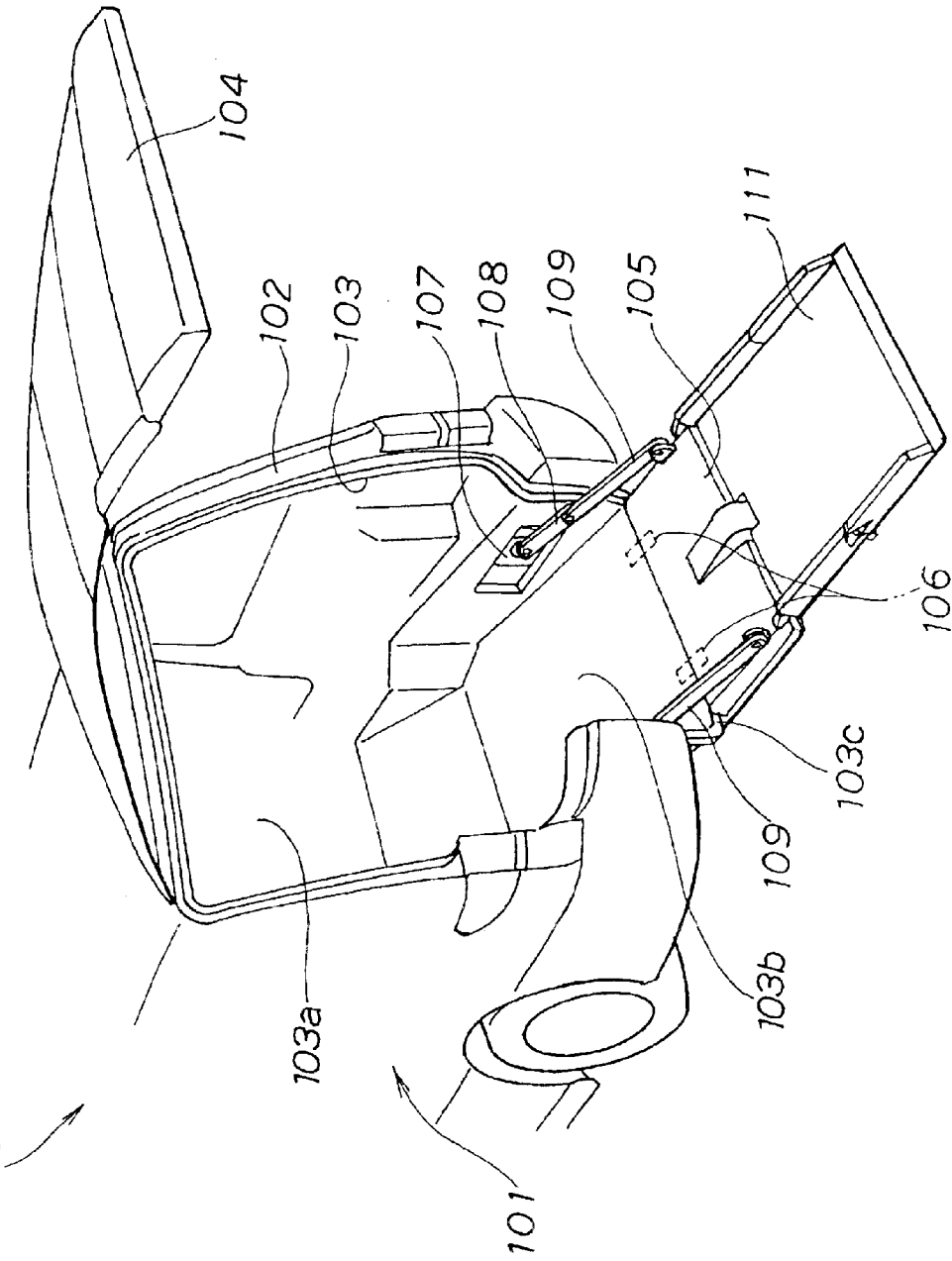
FIG. 15 is a schematic diagram of a conventional vehicle tailgate structure.

Now a damper mechanism according to a third embodiment will be described with reference to FIG. 14. FIG. 14 is a diagram corresponding to FIG. 8, in which components identical to those of the damper mechanism illustrated in the first embodiment are given identical reference numerals and will not be described in detail.

A damper mechanism 90 in the third embodiment is different from the damper mechanism 50 in the first embodiment shown in FIGS. 4 to 11 in that a rotary damper 93 is used in place of the damper stay 71. The rotary damper 93 is filled with liquid or gas for slowing the rotary movement of a damper shaft 93a.

The damper mechanism 90 has a flat damper mounting portion 92 formed in a recess 91 set back from an inner panel 16 toward an outer panel 15, to which damper mounting portion 92 the rotary damper 93 is secured by bolting. The damper shaft 93a of the rotary damper 93 extends horizontally toward the vehicle transverse center CL. The damper shaft 93a is fitted into a fitting hole 94a of a hinge shaft 94 so that the damper shaft 93a and the hinge shaft 94 are restricted in relative rotation while axially movable. The hinge shaft 94 is extended horizontally toward the vehicle transverse center CL to pass through an interior panel 19. A door holding part 54 is mounted on a distal end 94b of the hinge shaft 94 in a relatively non-rotatable manner. A flange 54a at the distal end of the door holding part 54 is secured by bolting to a side plate 42 at a lower portion 41 of the lower door 40.

The hinge shaft 94 has a rectangular cross-sectional shape to fit in a rectangular fitting hole of the door holding part 54. That is, the door holding part 54 and the hinge shaft 94 are mounted to be restricted in relative rotation while axially movable. The damper shaft 93a and the hinge shaft 94 are restricted in axial movement by a screw 95. The lower door 40 is supported by the rotary damper 93 via the hinge shaft 94 in a vertically swingable manner.

The fact that the rotary dampers 93 are thus placed within the recesses 91 set back from the inner panels 16 toward the outer panels 15 allows the left and right damper mechanisms 90 to be placed between the outer panels 15 and the inner panels 16 constituting side panels 14.

Now, the assembling procedure of the damper mechanism 90 in the third embodiment will be described. The lower door 40 has a recess 44 shown by imaginary lines set back toward the vehicle transverse center CL. The hinge shaft 94 has a collar 94c at the distal end 94b.

First, the rotary dampers 93 are bolted to the damper mounting portions 92.

Then, the hinge shafts 94 are fitted into the door holding parts 54 and the door holding parts 54 are secured to the lower door 40. In this state, the collars 94c abut on the edges of the door holding parts 54, and the hinge shafts 94 are axially slidable by the depth of the recesses 44.

With the hinge shafts 94 drawn into the recesses 44, the lower door 40 is interposed between the left and right side panels 14, 14 (only the left one is shown in the figure).

Finally, the hinge shafts 94 are drawn out from the recesses 44, fitted onto the damper shafts 93a, and secured by the screws 95. The assembling work is finished.

As described above, the lower door 40 is vertically swingable about the damper shafts 93a. Swinging the lower door 40 allows the lower door 40 to be tilted about the damper shafts 93a for opening or to be raised for closing. With the swing of the lower door 40, the damper shafts 93a rotate, exerting damping effects, and the lower door 40 slowly opens or closes.

The damper mechanism 90 in the third embodiment eliminates the hinge arm 61 and the first and second links 63 and 66 as compared with the damper mechanisms 50 and 80 in the first and second embodiments, resulting in a simplified and compact structure of the damper mechanism 90 with a reduced number of components. In addition, the damper mechanism 90 can be easily placed in a narrow space Sp within the side panel 14.

As described above, according to the tailgate structure of the vehicle 10 of the third embodiment, the damper mechanisms 90 are placed between the outer panels 15 and the inner panels 16, so that the damper mechanisms 90 are prevented from extending out to a rear opening 13 of a vehicle body 11 shown in FIG. 2 or to the vehicle outside when the lower door 40 is opened. The damper mechanisms 90 are thus prevented from obstructing loading and unloading of objects with the lower door 40 opened, increasing workability in loading and unloading through the rear opening 13. The damper mechanisms 90 are not seen when the lower door 40 is opened, improving the appearance of the vehicle 10.

In the above-described first, second and third embodiments, the damper mechanisms 50, 80 and 90 are attached to the lower doors 40, which is not limiting. The damper mechanisms 50, 80 or 90 may be attached to both the upper door 30 and the lower door 40 to slow the opening and closing movements of the upper and lower doors 30 and 40.

The present disclosure relates to the subject matter of Japanese Patent Application No. 2002-241954, filed Aug. 22, 2002, the disclosure of which is expressly incorporated herein by reference in its entirety.

What is claimed is:

1. A vehicle rear structure, comprising:
    a vehicle body having an opening at a rear portion of said vehicle;
    an upper door and a lower door for closing said rear opening; and
    a damper mechanism placed between an outer panel and an inner panel constituting a wall of said vehicle body and attached to at least said lower door for slowing opening and closing movements of said lower door.

2. The rear structure as set forth in claim 1, wherein said damper mechanism comprises:
    a hinge support provided within said wall in the vicinity of a lower edge portion of said rear opening;
    a hinge shaft rotatably mounted to said hinge support, said hinge shaft having a distal end extending from said wall toward the vehicle transverse center to be mounted to a lower portion of said lower door;
    a hinge arm extending from said hinge shaft radially of said hinge shaft; and
    a damper stay having a first end and a second end, said first end being connected to a distal end said hinge arm in a vertically swingable fashion, said second end being connected to a stay support within said wall in a vertically swingable fashion.

3. The rear structure as set forth in claim 1, wherein said damper mechanism comprising:
    a hinge support provided within said wall in the vicinity of a lower edge portion of said rear opening;
    a hinge shaft rotatably mounted to said hinge support, said hinge shaft having a distal end extending from said wall toward the vehicle transverse center to be mounted to a lower portion of said lower door;
    a hinge arm extending from said hinge shaft radially of said hinge shaft;
    a first link having a first end connected to a distal end of said hinge arm in a vertically swingable manner;
    a second link having a first end connected to a second end of said first link in a vertically swingable manner;
    a link support provided within said wall for mounting a central portion of said second link thereto so that said second link is vertically swingable about said central portion;
    a damper stay having a first end connected to a second end of said second link in a vertically swingable fashion; and
    a stay support provided within said wall to which a second end of said damper stay is connected in a vertically swingable fashion.

4. The rear structure according to claim 3, wherein said hinge arm and said second link are arranged substantially parallel with respect to each other.

5. The rear structure according to claim 2, wherein the hinge shaft extends a predetermined distance from the hinge support for mounting the damper stay and the hinge arm to be out of interference with vehicle body components.

6. The rear structure according to claim 3, wherein the hinge shaft extends a predetermined distance from the hinge support for mounting the damper stay and the hinge arm to be out of interference with vehicle body components.

7. The rear structure according to claim 2, wherein said hinge shaft has a non-circular shape for mating with a non-circular shape aperture in the lower door and further including a set screw for preventing axial movement of the hinge shaft.

8. The rear structure according to claim 3, wherein said hinge shaft has a non-circular shape for mating with a non-circular shape aperture in the lower door and further including a set screw for preventing axial movement of the hinge shaft.

9. A damper mechanism for use with a vehicle comprising:
   a hinge arm including a distal end and a proximal end, said proximal end being mounted to a lower door designed for closing a portion of a rear opening of a vehicle;
   a damper including a first end and a second end, said first end being mounted on a vehicle wall adjacent to a rear opening in a position above said second end, and said second end being secured to said distal end of said hinge arm;
   wherein said damper slows the opening and closing movements of said lower door.

10. The damper mechanism for use with said vehicle as set forth in claim 9, and further including:
    a hinge support provided within said wall in the vicinity of a lower edge portion of the rear opening;
    a hinge shaft being rotatably mounted to said hinge support;
    said hinge arm extending from said hinge shaft radially of said hinge shaft; and
    said damper being connected to the distal end of said hinge arm in a vertically swingable fashion, said second end being connected to a stay support within a wall in a vertically swingable fashion.

11. The damper mechanism for use with said vehicle as set forth in claim 9, and further including:
    a hinge support provided within said wall in the vicinity of a lower edge portion of said rear opening;
    a hinge shaft being rotatably mounted to said hinge support;
    said hinge arm extending from said hinge shaft radially of said hinge shaft;
    a first link having a first end connected to the distal end of said hinge arm in a vertically swingable manner;
    a second link having a first end connected to a second end of said first link in a vertically swingable manner;
    a link support provided within said wall for mounting a central portion of said second link thereto so that said second link is vertically swingable about said central portion;
    a damper stay having a first end connected to a second end of said second link in a vertically swingable fashion; and
    a stay support provided within the wall to which a second end of said damper stay is connected in a vertically swingable fashion.

12. The damper mechanism for use with said vehicle according to claim 11, wherein said hinge arm and said second link are arranged substantially parallel with respect to each other.

13. The damper mechanism for use with said vehicle according to claim 10, wherein the hinge shaft extends a predetermined distance from the hinge support for mounting the damper stay and the hinge arm to be out of interference with vehicle body components.

14. The damper mechanism for use with said vehicle according to claim 11, wherein the hinge shaft extends a predetermined distance from the hinge support for mounting the damper stay and the hinge arm to be out of interference with vehicle body components.

15. The damper mechanism for use with said vehicle according to claim 10, wherein said hinge shaft has a non-circular shape for mating with a non-circular shape aperture in the lower door and further including a set screw for preventing axial movement of the hinge shaft.

16. The damper mechanism for use with said vehicle according to claim 11, wherein said hinge shaft has a non-circular shape for mating with a non-circular shape aperture in the lower door and further including a set screw for preventing axial movement of the hinge shaft.

17. The damper mechanism for use with said vehicle according to claim 3, wherein an operation to open said lower door causes said second end of the damper stay to extend in a downward direction.

18. The damper mechanism for use with said vehicle according to claim 2, wherein an operation to open said lower door causes said second end of the damper stay to move in an upward direction.

19. The damper mechanism for use with said vehicle according to claim 9, wherein an operation to open said lower door causes said second end of the damper to extend in a downward direction.

20. The damper mechanism for use with said vehicle according to claim 9, wherein an operation to open said lower door causes said second end of the damper to move in an upward direction.

* * * * *